March 6, 1951　　　　　E. R. PRICE　　　　　2,544,043
POWER BRAKE CONTROL WITH AUTOMATIC LOCKING MEANS
Filed Jan. 25, 1947　　　　　　　　　　　　　3 Sheets-Sheet 1

INVENTOR
EARL R. PRICE
BY
*T. J. Plante*
ATTORNEY

INVENTOR
EARL R. PRICE
ATTORNEY

Patented Mar. 6, 1951

2,544,043

UNITED STATES PATENT OFFICE 2,544,043

POWER BRAKE CONTROL WITH AUTOMATIC LOCKING MEANS

Earl R. Price, South Bend, Ind., assignor to Bendix Aviation Corporation, South Bend, Ind., a corporation of Delaware Application January 25, 1947, Serial No. 724,453

1 Claim. (Cl. 188—152)

This invention relates to power-operated means for actuating brakes, and particularly the power-operated means for controlling the auxiliary applications of the brakes, variously referred to as "parking brakes," and "emergency brakes."

The conventional "emergency" or "parking" brake of automotive vehicles is a hand-operated linkage which actuates either the shoes of the rear wheel brakes or a separate brake provided on the propeller shaft. The present invention is not concerned with the brakes themselves, i. e. with the actual friction stopping mechanism, but with the mode of obtaining auxiliary brake application, regardless of the location and nature of the brake or brakes which are applied for auxiliary purposes.

The present hand lever for obtaining emergency brake actuation is not as conveniently located or as accessible as it should be. Moreover, it could not readily be improved in this respect without interfering noticeably with the comfort of the occupants of the driver's compartment. It is also possible that future changes may be made in the arrangement of the driver's compartment which will render the present hand lever inconvenient, or unsightly, or both. Because of the foregoing reasons, and also for reasons of convenience and driving ease, it would be desirable to provide auxiliary brake actuating mechanism which can be controlled either by a finger-tip lever or by a control button.

An object of the present invention is to provide power-operated means for obtaining auxiliary brake actuation, thereby making it possible to utilize a finger tip control lever or a control button, in place of the present large hand lever.

A further object of the present invention is to provide means for automatically and/or releasing the auxiliary brake applying mechanism whenever certain events occur in the operation of the vehicle.

Other objects and advantages of the present invention will become apparent during the following discussion, reference being had therein to the accompanying drawings, in which.

Figure 1:
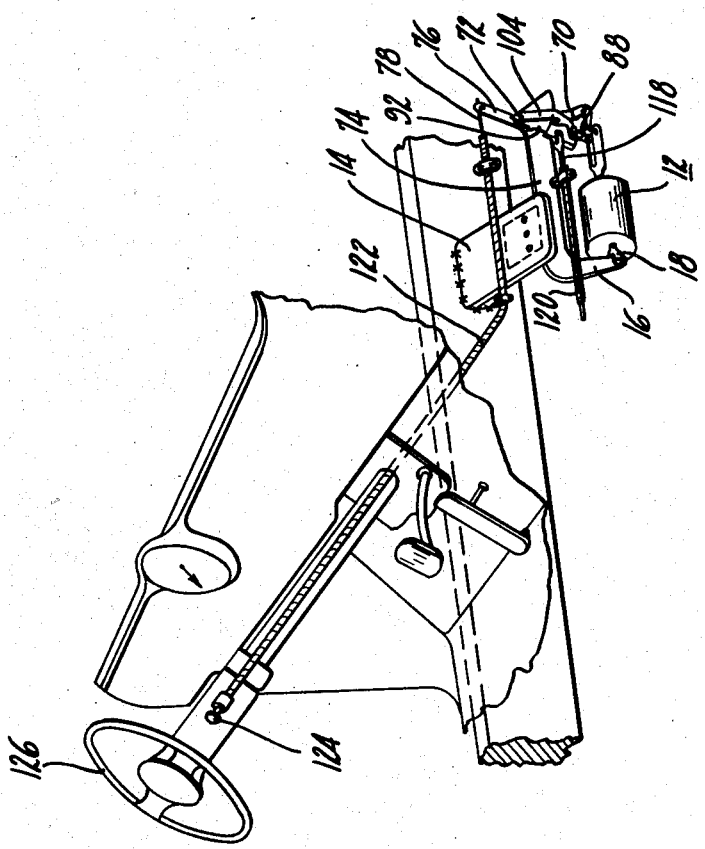
Figure 1 is a diagrammatic view showing a power-operated auxiliary brake actuating mechanism and its manual control.
Figure 2:
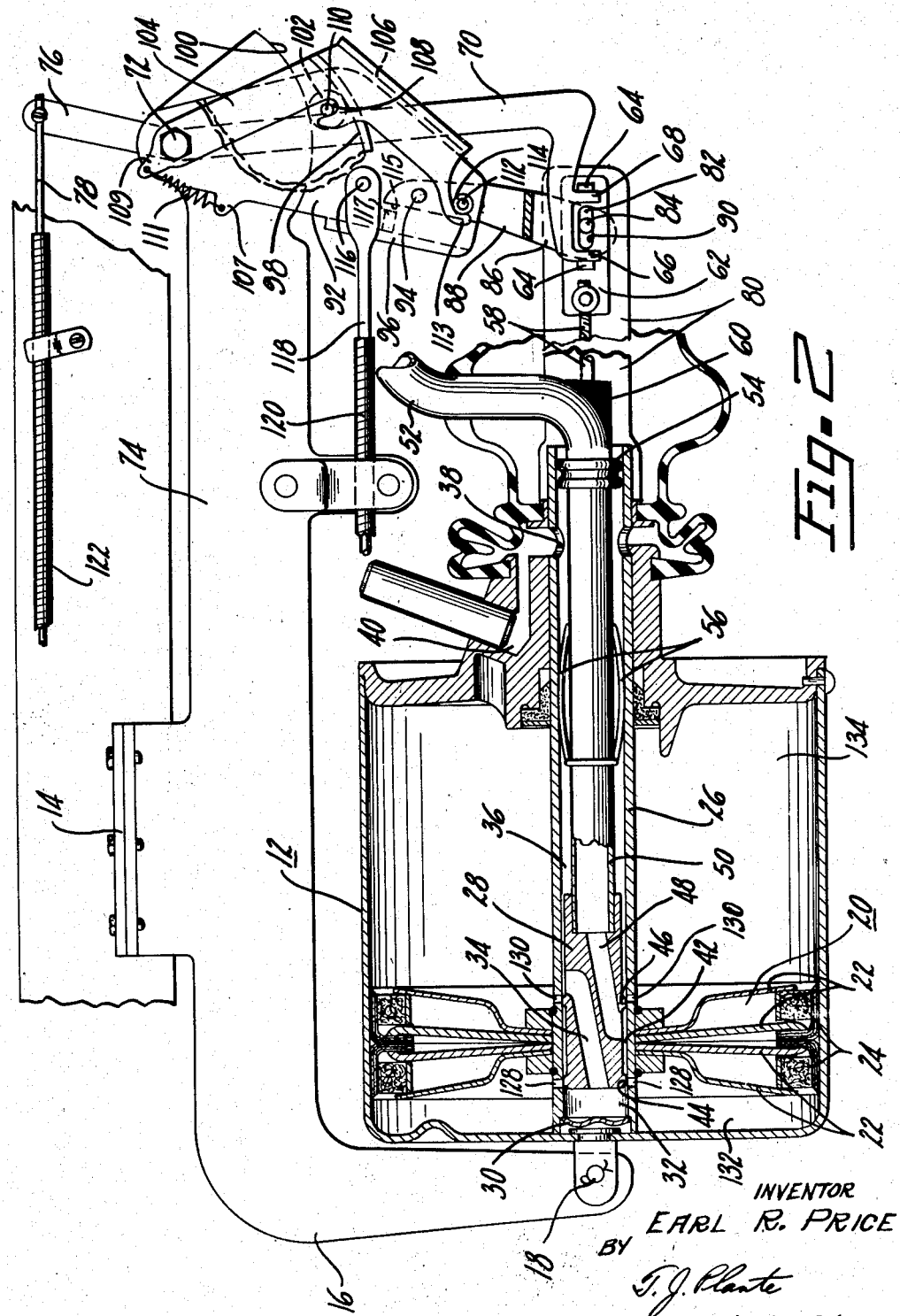
Figure 2 is a part-sectional, part-outline enlarged view of the power actuator and lever system of Figure 1.

Referring to Figures 1 and 2, the auxiliary (or parking) brake control system is illustrated as embodying a simple manual control combined with a power cylinder having an internal control valve mechanism.

The power cylinder 12, which is of the double-acting type (i. e. its piston is urged in either direction solely by a fluid pressure differential), is supported on the vehicle frame by means of a bracket 14 from which depends a supporting arm 16. The casing of the power cylinder is pivotally supported at 18, in order to permit slight pivotal movement which compensates for arcuate movement of the lower end of the power operated brake lever.

Reciprocable within power cylinder 12 (see Figure 2) is a piston 20, which includes a plurality of plates 22 and suitable sealing members 24 held in position by the plates. The piston 20 is secured by suitable means to a tubular member 26, which extends through an opening in the right end of the cylinder, and which is arranged to transmit operating force to the power operated lever, whence the force is transferred by suitable means to the brakes.

A sliding valve member 28 is reciprocably mounted inside the tubular member 26, and is so arranged and constructed that its movements relative to the tubular member control the changes in pressure on opposite sides of the piston 20. The left end of tubular rod 26 is closed by a seal 30, and a chamber 32 is provided between the seal 30 and the left end of the valve member 28. The chamber 32 is permanently connected, by means of passage 34 formed in the valve member, with an annular space 36 which is in constant communication through ports 38 (formed in tubular rod 26) and passage 40 with air at atmospheric pressure. An annular chamber 42, which is formed between lands 44 and 46 on the valve member, is permanently connected, by means of passage 48 formed in the valve member, with the interior of a tube 50, which is secured at its left end to the valve member, and which has its right end bent outwardly, as at 52, to form a conduit, which may be connected by a suitable length of hose to a source of vacuum, such, for example, as the usual intake manifold. The right end of the straight portion of tube 50 is supported in tubular rod 26 by means of the collar 54, and an anti-rattle device 56 may be provided intermediate the ends of the straight portion of the tube.

A short rod 58 is secured to the bent side of tube 52 by means of the brazing material 60. The right end of rod 58 is threaded and is adjustably secured to two spaced links 62, only one of which is seen in Figure 2. Extending transversely between, and supported by, the links 62 are two longitudinally spaced abutments 64, which engage the outer edges of the forks 66 and 68 provided on the end of valve-operating lever 70. Lever 70, which is fulcrumed at 72 on the arm 74 of supporting bracket 14, has an upwardly extending arm 76 which is connected to a manually operated cable 78.

A clevis 80, only one arm of which is seen in Figure 2, is secured to the tubular rod 26, and has aligned openings in its arms near the ends thereof, through which extends a pin 84, the pin being a tight fit in the openings. The pin 84 also extends through openings 82 formed in the forked ends 86 (only one of which is seen in Figure 2) of power lever 88. As shown in the drawing, elongated slots 90 are provided in the plates 62 and there is sufficient space between the pin 84 and the forks 66 and 68 of valve lever 70 to provide the required lost motion between valve member 28 and tubular rod 26.

The additional levers associated with power lever 88 are constructed and arranged to provide an automatic locking means for the parking brake. Moreover, the arrangement is such that the locking means can be released by a simple return movement of the power cylinder, without requiring as a preliminary step the application of a releasing force acting in a different direction from the actuating force. A lever 92 is pivotally mounted at 72 and is connected by means of pin 94 to the upper end of lever 88. The lever 92 may, as shown, consist of spaced identical side plates which are integral parts of a sheet metal member folded along the edge 96. Secured to and extending transversely between the sides of lever 92 is a plate 98 which has an arcuately curved upper surface, as shown, the arc being eccentric with respect to pivot 72, and being centered at a suitable point left of the pivot. The lower surface 100 of the right end of supporting arm 74 is also arcuately curved, the arc being concentric with pivot 72. A roller 102 is located between the surface 100 and the upper surface of plate 98 and is adapted to engage the two surfaces simultaneously. It will be seen in the drawing, that the two arcuate surfaces tend to diverge at the left end and to converge at the right end.

Movement of the roller 102 is controlled by a lever 104, which is pivoted at 72, and which may, as shown, consist of spaced identical side plates which are integral parts of a sheet metal member folded along the edge 106. Aligned slots 108 are provided in the sides of lever 104 to receive the reduced diameter extensions 110 of the roller 102, enlarged openings being provided in the sides of lever 92 to permit the extensions 110 to pass through. The sides of the slots 108 are, as shown, spaced sufficiently to provide clearance between the extensions 110 and at least one side of the slots, thereby allowing the roller some movement relative to lever 104.

In order to urge the lower ends of levers 104 and 92 apart, and thereby urge roller 102 toward engagement with surfaces 98 and 100, a spring 111 is connected between suitable ears 107 and 109 provided on the two levers. Assuming lever 92 is stationary, spring 111, unless prevented by other circumstances from doing so, urges lever 104 in a counterclockwise direction, thereby causing the left edge of slots 108 to hold the roller in engagement with surfaces 98 and 100. In order to provide means for extending spring 111 when it is necessary to move the roller out of engagement with the wedging surfaces, a pin 112 carried by lever 88 is arranged to at times engage an arm or hook 113 on the end of lever 104. The pin 112 passes through an enlarged opening 114 in lever 92 to permit it to move to and fro without engaging lever 92. Conjoint movement of levers 88 and 92 is nevertheless obtained after a slight initial relative movement by engagement of the upper end 115 of lever 88 with an abutment 117 on lever 92, the abutment being secured between the folded sides of the lever.

A pin 116 connects lever 92 to the end of a cable 118 which leads to the brake, or brakes, the cable being sheathed in a conduit 120. The cable 78, previously referred to, extends through a conduit 122 and terminates in a manual control button 124 which is mounted on the side of the steering column, just under the steering wheel 126.

Operation of the power parking brake control system of Figures 1 and 2 is as follows. When the operator wishes to utilize the auxiliary brake actuating mechanism, he pulls upwardly on the control button 124, thereby pulling cable 78 and turning lever 70 in a counterclockwise direction. The fork 68 of lever 70 pushes against abutment 64 of links 62 to draw tube 50 and valve member 28 toward the right.

In released position, as shown, land 44 covers the ports 128 in tubular rod 26 except for a slight clearance at the left end of the land, and land 46 covers the ports 130 in the rod except for a slight clearance at the right end of the land. With this arrangement, the power cylinder is said to be "atmosphere suspended," since air at atmospheric pressure is present, in released position, on both sides of the piston.

As valve member 28 moves toward the right, ports 128 remain in communication with chamber 32, and ports 130 are brought into communication with chamber 42. Thus chamber 132 of the power cylinder remains connected to the atmosphere, whereas chamber 134 of the power cylinder is connected to the vacuum source. A pressure differential is developed acting over piston 20, and the piston moves toward the right. As the piston and tubular rod 26 move on the brake applying stroke, the rod exerts a force, through clevis 80 and pin 84, on power lever 88. Because the rod 26 follows valve member 28, it will bring the power cylinder to "lapped" or holding position whenever the valve lever 70 ceases to move in the valve-opening direction.

During the initial very brief phase of its movement in the counterclockwise direction, power lever 88 rotates about pivot 94, moving pin 112 toward the right and permitting spring 111 to urge lever 104 in a counterclockwise direction and thereby bring roller 102 into engagement with surfaces 98 and 100. As soon as the upper portion 115 of lever 88 engages abutment 117 further relative movement of levers 88 and 92 is prevented, and they are caused to rotate as a single lever about the pivot 72, drawing cable 118 toward the right and applying the brakes. During this movement of levers 88 and 92, roller 102 is caused by spring 111 to follow up as surface 98 tends to move away from the roller, the roller remaining in engagement with surfaces 98 and 100.

As long as the operator does nothing to release the brakes, they will automatically remain in frictional engagement, because of the locking action of the roller and the system of levers. This locking action is present because the reaction force on cable 118 tending to move it to the left, instead of releasing roller 102, urges lever 92 into tight wedging engagement with the roller, thus providing a positive locking action. The tendency of the cable reaction to cause tighter engagement of the roller results from the fact that any tendency of lever 92 to rotate in a clockwise direction tends to draw the right end of surface 98 into engagement with the roller, and the brake reaction force tending to rotate the roller tries to roll it up the inclined surface 98 in such a way as to increase the wedging force.

As long as the button 124 is left in its upward position, the power cylinder piston remains in its applied, or rightward, position because there is no pressure differential or spring force urging it toward retracted position. Therefore the brakes remain locked without any further attention from the operator.

When the operator wishes to release the parking brakes, he pushes button 124 downwardly. This pushes cable 78 and causes lever 70 to turn in a clockwise direction. The fork 66 on the end of the lever, pushing against the leftward abutment 64, moves valve member 28 toward the left, causing ports 128 to communicate with vacuum chamber 42, while ports 130 remain in communication with the atmosphere. A differential pressure is developed acting on piston 20 to move it toward the left.

As the piston moves toward the left it rotates lever 88 in a clockwise direction, releasing the brake locking device. This occurs because pin 112 moves lever 104 in a clockwise direction against the action of spring 111, and simultaneously exerts a force through pin 94 and lever 92 to release the load on the roller. The roller moves out of wedging position, and the brakes are returned to released position by their return springs, drawing cable 118 and lever 92 toward released position. If the power piston is caused to stop before the brakes are fully released, they will be locked again because lever 92 will overtake lever 88 and again wedge the roller. Further leftward movement of the power piston will, of course, release the lock again.

Figure 3:
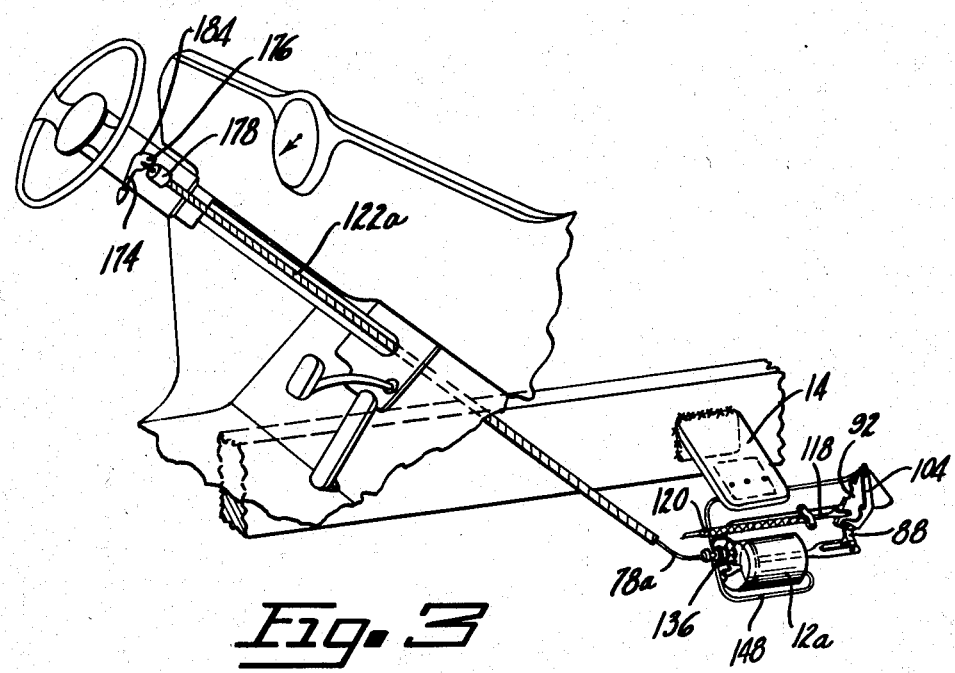
Figure 3 is a diagrammatic showing of a modified power parking brake arrangement.
Figure 4:
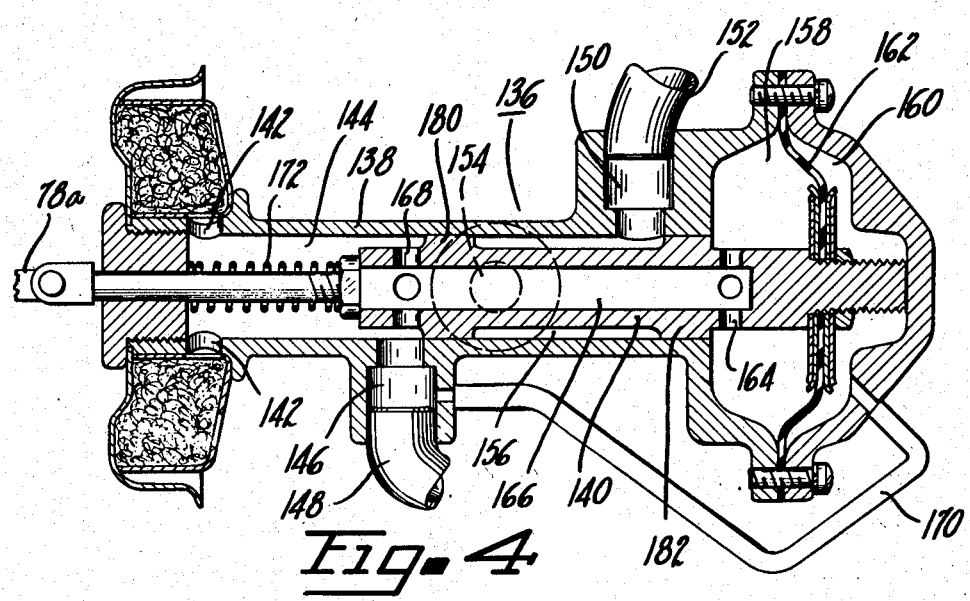
Figure 4 is an enlarged sectional view of the control valve of Fig. 3.

The parking brake control system shown in Figures 3 and 4 is similar to that shown in Figures 1 and 2, except that the power cylinder is controlled by a reactionary valve device, rather than the internal valve arrangement shown in Figure 2.

The hookup of Figure 3 has a double acting power cylinder 12a and a brake locking lever system similar to Figures 1 and 2, except that the power cylinder 12a does not have an internal valve member, such as member 28 of Figure 2. Instead, power cylinder 12a is controlled by a reactionary valve device 136.

Valve device 136 is shown in section in Figure 4. It includes a tubular body portion 138, within which slides a valve member 140. The body portion 138 is provided with ports 142 which provide communication between the atmosphere and chamber 144. A port 146 is connected by a pipe 148 to the right end of the power cylinder, and a port 150 is connected by a conduit 152 to the left end of the power cylinder. A vacuum port 154 leads to the annular chamber 156 formed between the valve member 140 and the tubular casing 138. The right end of the valve casing is divided into two chambers 158 and 160 by a diaphragm 162, the outer periphery of which is secured to the valve casing, and the inner periphery of which is secured to the right end of valve member 140. Chamber 158 is permanently connected to the atmosphere chamber 144 by means of passages 164, 166 and 168. A conduit 170 connects port 146 to chamber 160. Return spring 172 normally retains valve member 140 in its released position.

When the operator wishes to apply the parking brakes he pulls upwardly on hand lever 174. As the ear 176 of the lever rides over the upper surface of the fixed member 178, cable 78a, which is sheathed in conduit 122a, is drawn toward the left, pulling valve member 140. This causes land 180 to first cut off port 146 from atmosphere chamber 144, and thereafter connect port 146 to vacuum chamber 156. The rightward chamber of the power cylinder is therefore in communication with vacuum. At the same time land 182 disconnects port 150 from the vacuum chamber and connects it to the atmosphere chamber, thereby bringing the leftward chamber of the power cylinder into communication with the atmosphere. As the pressure differential moves the power cylinder piston rightwardly, the levers 88 and 92 are actuated in such a way as to apply the brakes, as explained in connection with Figures 1 and 2.

During the applying stroke of the power piston a pressure differential is developed over diaphragm 162 which resists the movement of cable 78a in the brake applying direction, and thus provides for the operator a "feel" indicating the extent of power actuation of the brakes. If the operator wishes to have the brakes remain applied, he moves the hand lever 174 past dead center position, until the surface 184 engages the upper surface of member 178. Thus lever 174 is locked in position and the control valve and power cylinder are held applied. If the engine is stopped and the vacuum disappears, the brakes will still be held applied because the levers 88—92—104 and the roller 102 will lock, as previously explained.

When the operator returns lever 174 to released position, the differential over diaphragm 162 (assuming vacuum is available) will move valve member 140 toward the right, reversing the connections of the power cylinder chambers. In other words, the right end of the power cylinder will be connected to air, and the left end to vacuum, thereby returning the power cylinder to released position.

From the foregoing, it will be seen that several versions of a power operated emergency brake have been provided, the arrangements being such that back and forth movements of the power cylinder piston either apply the brakes or release the automatic brake locking device. Furthermore, means have been provided for regulating the power device which operates the emergency brakes either partially or wholly by automatic controls.

Although certain particular embodiments of my invention have been described, it will be understood by those skilled in the art that the object of the invention may be attained by the use of constructions different in certain respects from those disclosed without departing from the underlying principles of the invention. I therefore desire by the following claim to include within the scope of my invention all such variations and modifications by which substantially the results of my invention may be obtained through the use of substantially the same or equivalent means.

I claim:

For use in a vehicle having parking brake applying means and means for automatically locking the parking brake applying means in applied position, in combination, a member movable in one direction to actuate the parking brake applying means and movable in the opposite direction to release the automatic locking means, a power device having a piston therein operatively connected with said member to control its movements in both directions, valve means arranged to control operation of said power device and having one position in which one side of the power piston is in communication with air at atmospheric pressure while the other side of the power piston is in communication with a vacuum source and another position in which the condition with respect to air and vacuum communication is reversed, an operator operated member mechanically connected to said valve means to control the same, a reaction element associated with said valve means arranged to exert a force against said operator operated member proportional to the force exerted by the power piston whenever said power piston is caused to exert applying effort on the parking brake applying means, and means for holding the operator operated member in its actuated position without requiring continued effort from the operator.

EARL R. PRICE.

REFERENCES CITED

The following references are of record in the file of this patent:

UNITED STATES PATENTS

| Number | Name | Date |
|---|---|---|
| 1,830,636 | Bragg | Nov. 3, 1931 |
| 1,848,458 | Bragg et al. | Mar. 8, 1932 |
| 1,963,444 | Mullins | June 19, 1934 |
| 1,998,972 | Snell | Apr. 23, 1935 |
| 2,205,346 | Clench | June 18, 1940 |
| 2,259,815 | Grene | Oct. 21, 1941 |
| 2,328,720 | House | Sept. 7, 1943 |

FOREIGN PATENTS

| Number | Country | Date |
|---|---|---|
| 250,913 | Great Britain | June 10, 1927 |
| 443,871 | Great Britain | Mar. 5, 1936 |

Certificate of Correction

Patent No. 2,544,043 March 6, 1951

EARL R. PRICE

It is hereby certified that error appears in the printed specification of the above numbered patent requiring correction as follows:

Column 1, line 39, after "automatically" insert *actuating*;

and that the said Letters Patent should be read as corrected above, so that the same may conform to the record of the case in the Patent Office.

Signed and sealed this 6th day of November, A. D. 1951.

[SEAL]

THOMAS F. MURPHY,
*Assistant Commissioner of Patents.*